United States Patent [19]
Allport et al.

[11] Patent Number: 6,061,050
[45] Date of Patent: *May 9, 2000

[54] USER INTERFACE DEVICE

[75] Inventors: David Edward Allport; John Christopher Rudin; Roger Brian Gimson, all of Bristol, United Kingdom

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/549,532

[22] Filed: Oct. 27, 1995

[51] Int. Cl.[7] .................................................. G09G 5/00
[52] U.S. Cl. ......................................... 345/173; 345/156
[58] Field of Search .................................... 345/173, 174, 345/156; 395/155

[56] References Cited

U.S. PATENT DOCUMENTS

| | | | |
|---|---|---|---|
| 4,302,011 | 11/1981 | Pepper, Jr. ............................... | 345/173 |
| 4,910,504 | 3/1990 | Ericksson ................................. | 345/174 |
| 4,990,900 | 2/1991 | Kikuchi .................................... | 345/174 |
| 5,376,948 | 12/1994 | Roberts ................................... | 345/156 |
| 5,414,413 | 5/1995 | Tamaru et al. ........................... | 345/173 |
| 5,463,725 | 10/1995 | Henckel et al. ......................... | 395/155 |
| 5,675,361 | 10/1997 | Santilli .................................... | 345/173 |
| 5,831,600 | 11/1998 | Inoue et al. ............................. | 345/156 |

*Primary Examiner*—Richard A. Hjerpe
*Assistant Examiner*—Ronald Laneau

[57] ABSTRACT

A user interface device for intuitive sequencing through displayed information comprises a cue block 10 with a top smooth curved control surface 12 and downwardly inclined ribbed or textured control surfaces 14, which suggest the smooth surfaces of the exposed pages of an open book, and the ribbed edges of the page edges to either side, respectively. The device detects the location or movement of a user's finger on or near the control surfaces and maps this to appropriate page turning commands to control the speed, direction and/or mode of sequencing.

21 Claims, 5 Drawing Sheets

USER INTERFACE DEVICE

FIELD OF THE INVENTION

This invention relates to user interface devices for allowing a user to control the presentation of information on a display.

BACKGROUND OF THE INVENTION

Typical methods for manipulating computer generated and displayed images include the use of a mouse to select a scroll bar, or "Page Up" and "Page Down" keys. However, these methods are not intuitive and are not particularly well adapted for browsing or skim reading through a multi-page document, or for quickly searching through such a document to find a particular passage. There have been proposals for gestural control of computers or other electrical/electronic instruments, but these have been very abstract in terms of the lack of intuitive support for the control function to be imparted and have required a reasonably high degree of skill or training. A significant problem encountered in gestural control systems is the ambiguity of gestures, and their potential misinterpretation, particularly when several different users are involved.

The word "gesture" and similar in this specification, is used broadly to cover gestures such as pointing, touching, stroking, waving etc.

SUMMARY OF THE INVENTION

We have designed a user interface device which facilitates intuitive sequencing through displayed information, for example page turning, scrolling, progressing through menu options, etc., and which encourages user's gestures to conform to certain distinctive standardised movements.

Accordingly, in one aspect, this invention provides a user interface device for allowing a user to perform a sequencing operation through displayed information, which comprises a cue object having distinguishable control surface regions, means for detecting user location and/or movement relative to said control surface regions, wherein said device is configured so that the position of a user gesture relative to the control surface regions determines at least one of:

(i) the speed of the sequencing operation, and (ii) whether the sequencing is discrete or continuous.

The user location/movement detecting means preferably includes means for sensing a gestural movement over or above one of said control surface regions. The detecting means preferably includes means for interpreting said gestural movement.

The control surface regions could be distinguished by any suitable means such as colour, but it is preferred for the regions to be distinguishable by touch, to allow tactile feedback. It is particularly preferred for the cue object to mimic the distinguishable surfaces presented by the centrefold of an open book, namely the smooth upper surface or surfaces defined by the open pages, and the ribbed or textured surface regions defined by the page edges, to either side of the smooth upper surfaces. Thus, one control surface may be smooth and curved, and another textured or ribbed. In this manner, the user is encouraged to use a small number of relatively standardised gestures, which can be detected and recognised.

Appropriate movements or gestures over the smooth control surface may be interpreted as a single page turning movement and used to increment the sequencing once, whereas movement over the ribbed control surface may be interpreted as a demand for continuous turning, or turning of several pages at once, with the frequency, speed or number of pages being a function of the user position or velocity relative to extent of the ribbed control surface, and these movements used to increment the sequencing accordingly.

In one preferred embodiment, there is a central curved control surface region, suggesting the surfaces of the open pages, and a downwardly inclined ribbed or textured control surface region disposed to each side thereof, suggesting the page edges on the side of an open book. Here the device is preferably configured so that user movement on the right hand side of the curved control surface or near the right hand ribbed or textured control surface causes sequencing in the forward sense, whilst user movement on the left hand side of the curved control surface or near the left hand ribbed or textured control surface causes sequencing in the reverse sense.

The cue object may be stand-alone for being placed on a work surface within easy reach of the user, and manipulated usually with one hand only. The user may operate with either hand, as convenient.

Alternatively, the cue object may include means for attachment to a display panel on which the displayed information is presented. In some arrangements, two co-operating such cue objects may be provided, for being attached to either side of the display panel, so that the or each cue object is in close proximity to the displayed information. Where the panel is rectangular and the information on the panel may be presented in portrait or landscape format, the or each interface device is preferably also attachable to the perpendicularly disposed sides of the panel.

The means for detecting may take many forms. In a preferred arrangement it includes transmitting and receiving means for creating an electrostatic electric field, and means responsive to the current at said receiving means for determining the user position or gesture. In this arrangement, no pressure is required and there need be no contact between the user's finger, hand etc and the control surface, and so the user may simply gesture within a short distance of the surface, sufficient to cause a noticeable effect on the electrostatic field.

The means for detecting may include a single type of arrangement for detecting location and/or movement adjacent all the distinguishable control surface regions. However, in some circumstances it may be preferred to implement different types of detecting adjacent the distinguishable control regions. Thus, in one arrangement, electrostatic sensing may be used for detection adjacent the smooth control surface region, and a different technique, e.g. capacitative surface pressure detecting, for detection adjacent the ribbed or textured control surface region.

In addition to the electrostatic and capacitative methods referred to, other sensing techniques may be used such as infra red or visible light reflection, ambient light shadowing, pyroelectric (detection of body heat), or acoustic, for example by emitting and detecting reflected ultrasonic pulses.

The device preferably includes means for mapping selected user movements and speeds relative to said control surface regions to corresponding control commands for said sequencing operations.

Whilst the invention has been described above, it extends to any inventive combination of the features set out above or in the following description.

BRIEF DESCRIPTION OF THE DRAWINGS

The invention may be performed in various ways and, by way of example only, two embodiments thereof will now be described in detail, reference being made to the accompanying drawings, in which.

DESCRIPTION OF THE PREFERRED EMBODIMENTS

In the embodiments of user interface device described below, sensing of the human hand or finger is done at touching or close range to the surface of a cue object which suggests and provides spatial and tactile feedback corresponding to the task of manipulating and navigating through information structures in paginated form.

Figure 1:
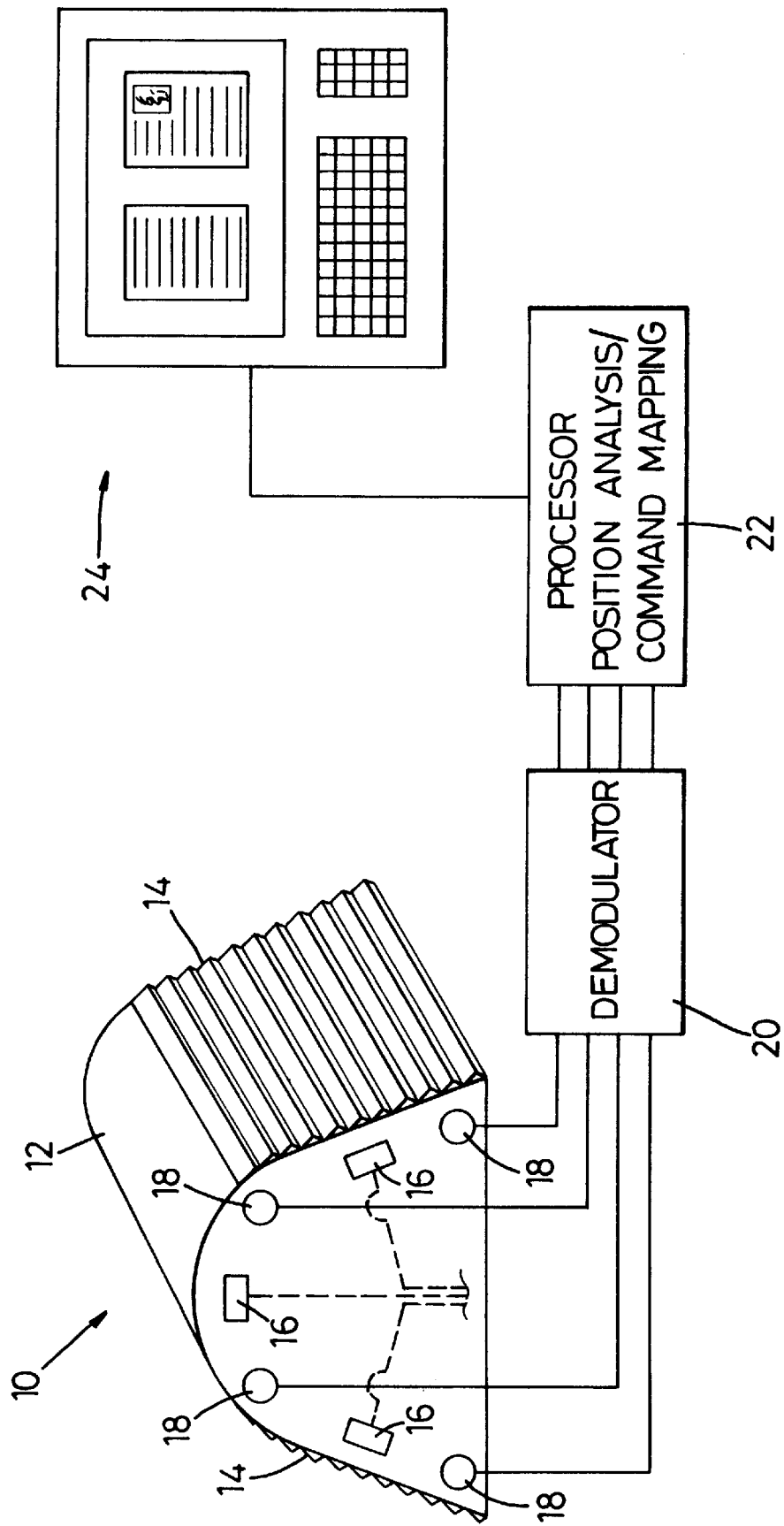
FIG. 1 is a perspective view of a first embodiment of user interface device in accordance with this invention.
Figure 2:
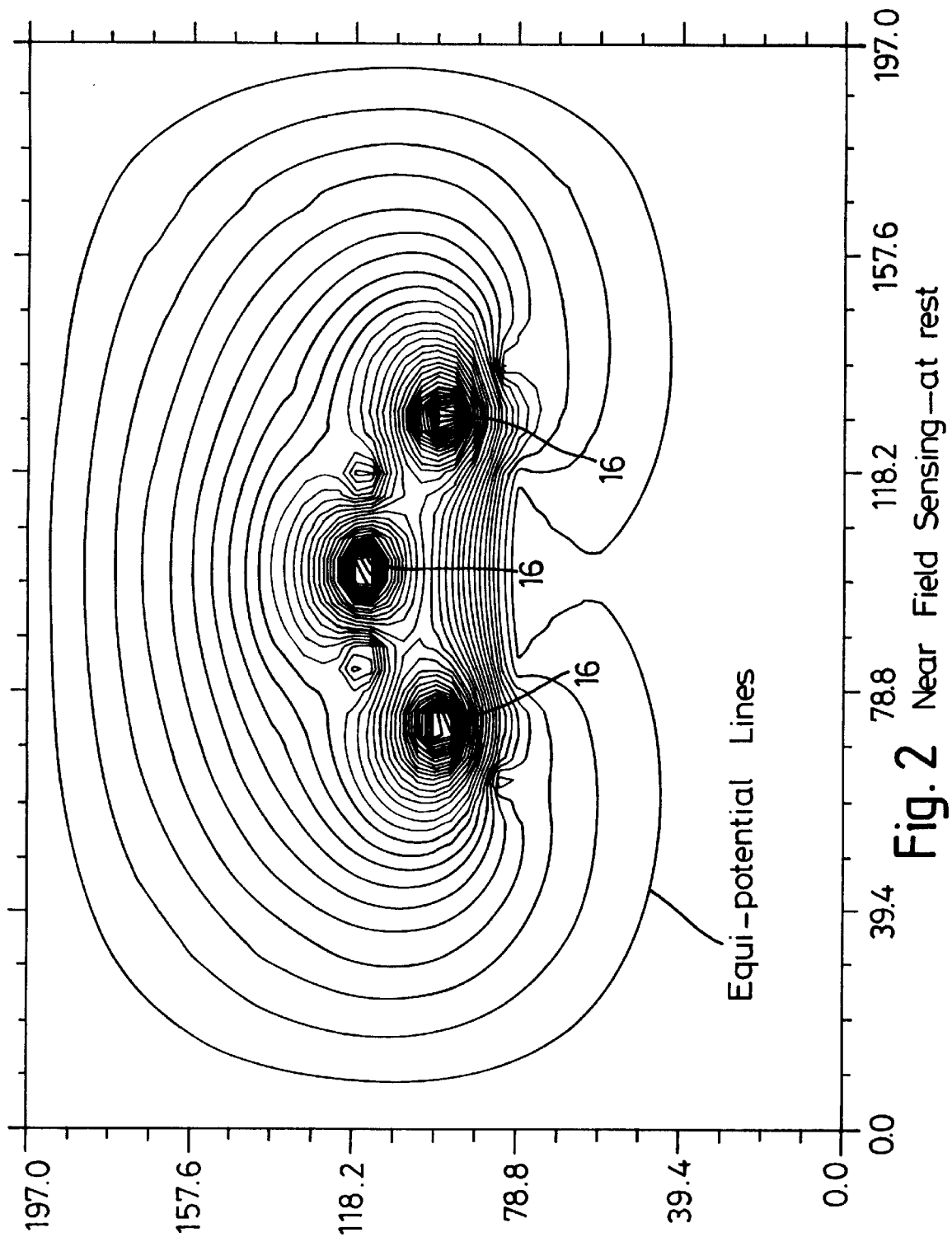
FIG. 2 illustrates the electrostatic field generated around the device of FIG. 1.

Referring to the embodiment of FIG. 1, a cue block 10 has a smooth convexly curved top control surface 12 and downwardly inclined ribbed control surfaces 14 to either side. Three elongate transmitting electrodes 16 run along the length of the cue block under the surface thereof, under the centre of the top control surface 12, and half-way down each ribbed control surface 14 respectively. Four elongate receiving electrodes 18 run along the length of the cue block 10 under the surface, adjacent each horizontal edge of each ribbed control surface 14. The cue block 10 includes shielding (not shown) to prevent interference from objects or sources below the cue block 10. As seen from FIGS. 2 and 3, the arrangement of the electrodes is designed to throw an electrostatic field around the peripheral surface of the device rather than into the whole of the local free space, so that the subsequent signal processing can be simplified to a two dimensional problem when analysing user gestures, rather than a truly three dimensional problem.

Figure 3:
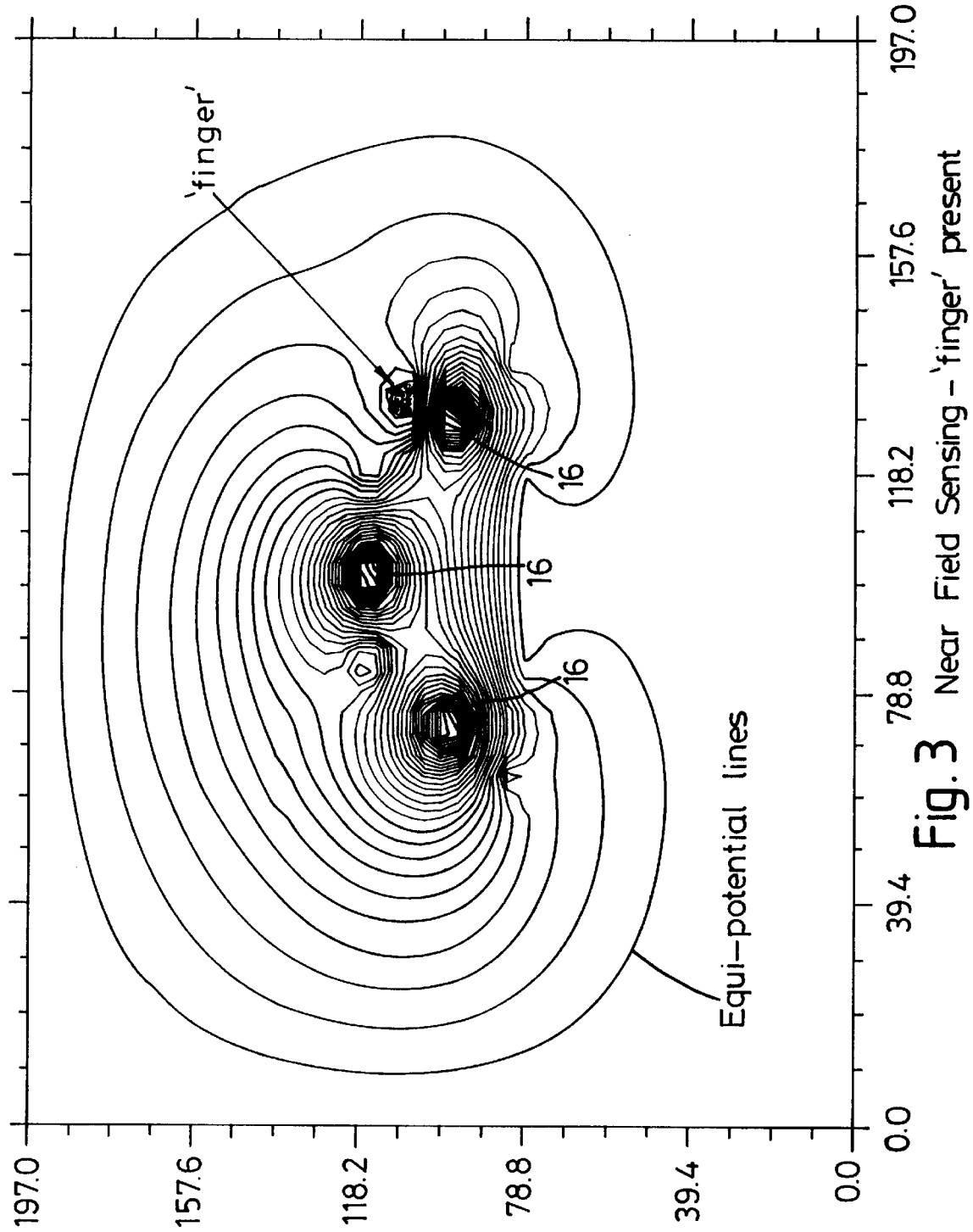
FIG. 3 illustrates the electrostatic field generated around the device of FIG. 1, when distorted by a user's finger.

In use the transmitting electrodes 16 are energised in this example by oscillating voltages at 130 kHz at the same phase and frequency, so that the field strength at each of the four receiving electrodes may be influenced by one or more of the transmitting electrodes. The signals from the four receiving electrodes 18 are demodulated at 20 using four demodulators and low pass filters to obtain the field strengths, and from this the position of any object distorting the field can be determined, for example by using the near field processing techniques described in U.S. Pat. No. 5,247,261. Thus, when a user's finger or other body part is brought close to the cue object 10, within the electrostatic field, the user effectively shunts some of the electric field to the local ground. The net effect is to distort the field, as shown in FIG. 3, and the nature of the distortion is determined by the current flows into the four receiving electrodes 18. By using the net and differential current measurements, the position of the user's finger or body part is determined, thus giving the position and allowing velocity to calculated, both with respect to the surface of the cue block 10.

The relative field strengths are processed by a processor 22 to determine the position and speed of movement of the user's finger or body part over the cue block 10. The positions and velocity, and how these change with time, i.e. the gesture of the finger or body part, are mapped by the processor 22 into an appropriate page turning command for the electronic information appliance 24. In this case, small horizontal movements from the edges of the top control surface 12 towards the centre are mapped to single page turns, with the direction determined by the position (left or right) of the gesture on the top control surface. The vertical position of the user's finger relative to the ribbed control surface 14 at the side of the cue block is mapped to a frequency of multiple or continuous page turning (i.e. riffling), with the sense of movement determined by whether the user's finger is adjacent the left hand or right hand ribbed surfaces. Thus placing a finger near the top edge of the ribbed surface of the right hand ribbed control surface 14 will cause low frequency continuous page turning, with the frequency increasing further down the ribbed control surface. Equally, the velocity of the user's finger moving down the ribbed surface might be used to determine the frequency at which the pages are turned.

The mapping function may be implemented as follows. For the top surface, the difference between the signal strengths received at the upper left and right receiving electrodes is monitored to determine position and velocity. If the absolute velocity is greater than a preset threshold, and the difference indicates the side the finger is moving away from, (ie motion towards the centre of the control surface 12), a single page turn command is issued (forward on the right, backwards on the left). The interface is then locked until the motion has been reversed and restarted, to prevent an opposite page turn when the finger is returned to the edge of the control surface.

For the forward and reverse riffling, the mapping is based on monitoring the signals from the receiving electrodes on the appropriate side of the block to determine the vertical position of the finger relative to the height of the block and the proximity of the finger to the block. When the finger is brought close enough to the block at a height below a preset threshold, continuous page turning is initiated at a frequency which varies inversely with the height of the finger.

Figure 4:
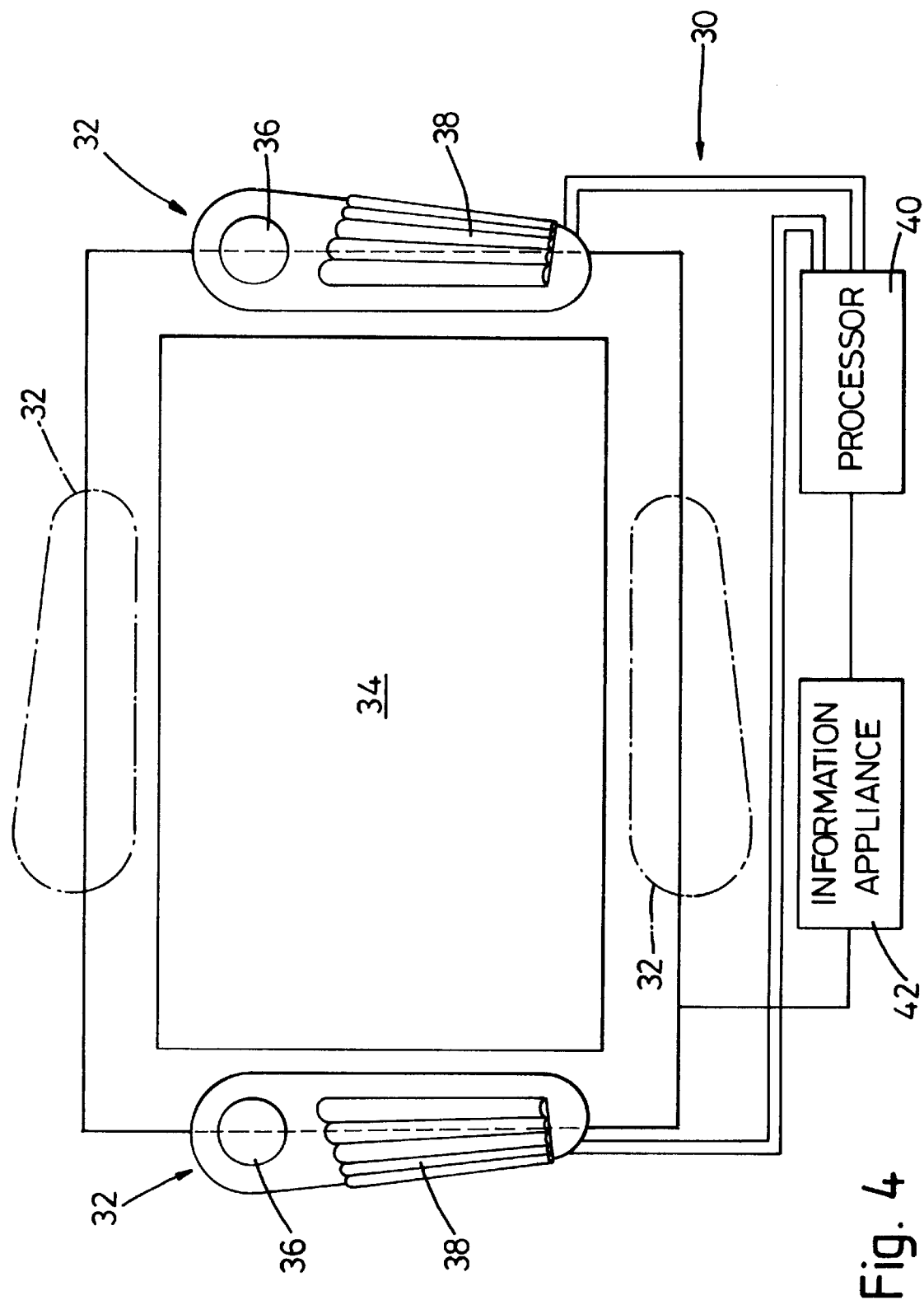
FIG. 4 illustrates a second embodiment of user interface device attached to a panel display.

Referring now to the second embodiment, shown in FIG. 4, the device 30 comprises two cue blocks 32 which are slotted to allow them releasably to be slid or clamped onto opposite edges of a display panel 34. As drawn, the display panel is being used in landscape format, but the cue blocks 32 may be attached to the other two sides as shown in dotted lines if the display is used in portrait format. Each cue block 32 has two distinctly surfaced sensors; a concavely curved smooth electrostatic sensor 36, and below it a convexly curved textured capacitative sensor 38. These sensors perform similar functions as the smooth and ribbed control surfaces 12, 14 in the first embodiment, but here they are not contiguous.

Figure 5:
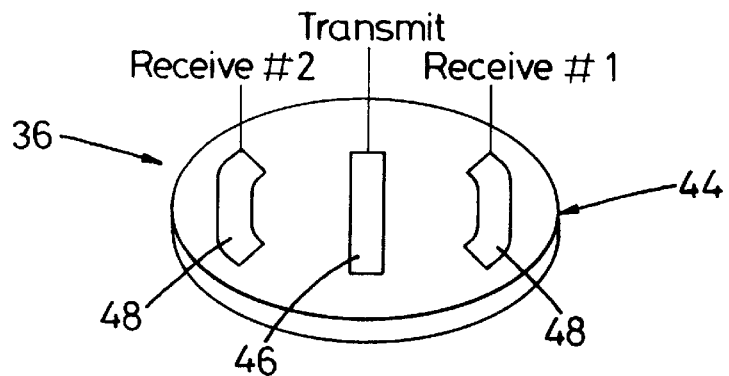
FIG. 5 is a detailed view of one of the electrostatic sensors used in the second embodiment, showing the electrode configuration.

Referring to FIG. 5, the electrostatic sensor 36 comprises a smooth concave elliptical plate 44, from the lower surface of which are spaced a transmit electrode 46, which provides a suitable electric field, and two receive electrodes 48. As in the first embodiment, the transmit electrode 46 is driven by a high frequency voltage—typically around 100 kHz, and the relative field strengths picked up by the receive electrodes are used to determine the position of any object which disturbs the field.

Figure 6:
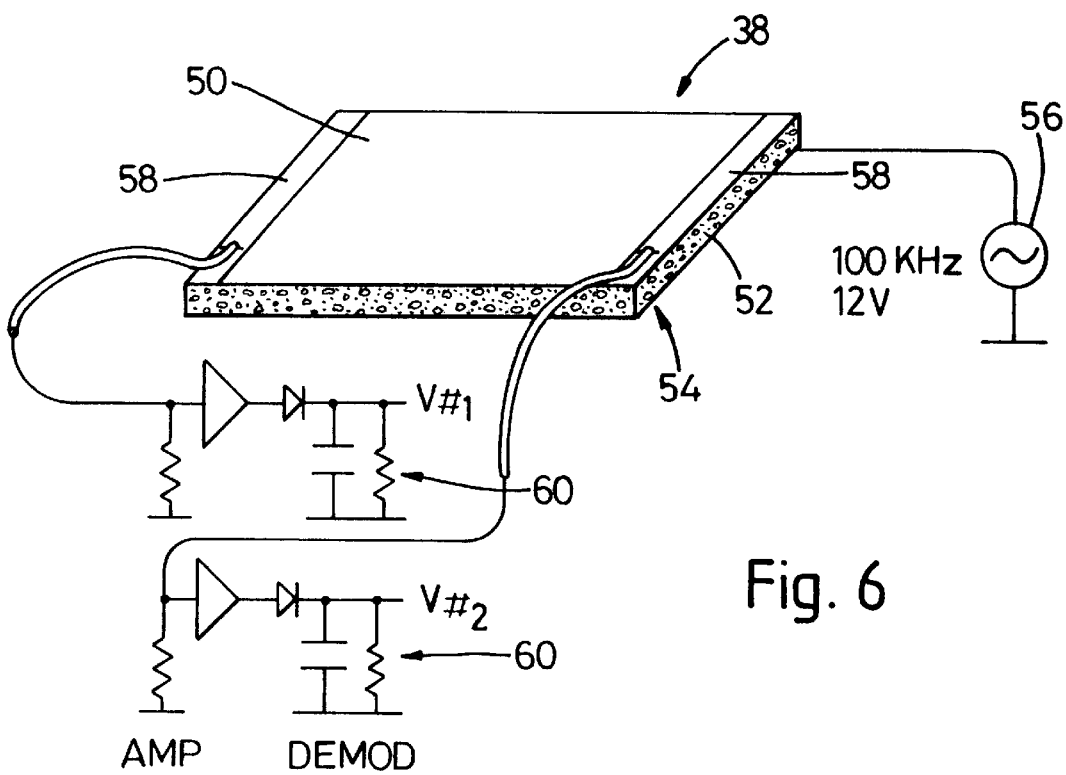
FIG. 6 is a simplified schematic view of one of the capacitative sensors used in the second embodiment.
Figure 7:
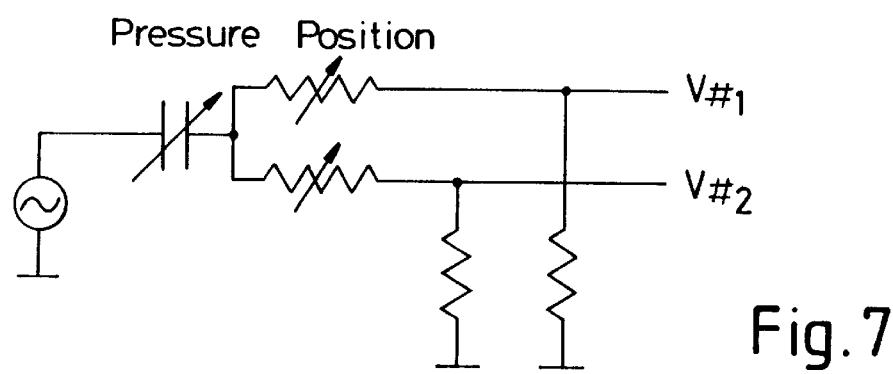
FIG. 7 is a simplified electrical circuit model of the sensor of FIG. 6.

The capacitative sensor 38 is illustrated in FIGS. 6. and 7. Here, the sensor is shown flat and untextured for ease of illustration and comprises a sandwich construction made up of an upper, flexible, high impedance conductor 50, e.g. of conductive plastics, a compressible, non-conducting foam core 52 and a lower, rigid, low impedance conductor 54, to form a simple plate capacitor. The lower conductor 54 is driven at a high frequency (typically about 12V at about 100 kHz) by a fixed oscillator 56, and the voltages at opposite edges of the upper high impedance conductor 50 are tapped by metallised connectors 58. When pressure is applied, the upper conductor 50 deflects and the capacitance alters accordingly, and this is detected by using the change in impedance between the oscillator 56 and two AM demodulation circuits 60. The use of a high impedance conducting plastic upper conductor 50 means that the impedance at each edge can be determined, thus allowing the position of the change in capacitance to be determined in one direction (in this example how far around the curved edge the finger depressing the upper conductor lies). As can be seen from the circuit model of FIG. 7, the sum of the voltage outputs $V_1$, $V_2$ of the two demodulators 60 is proportional to the applied pressure, whereas the difference is proportional to the position of the applied force relative to the metallised connectors 52.

As in the first embodiment, the detection signals relating to each sensor 36, 38 are processed by a processor 40 to indicate the position and velocity of the user's finger relative thereto, and the values of position and velocity are mapped by the processor to appropriate page turning commands for the information appliance 42 which drives the display panel 34. Here though, forward movement is controlled through the right hand cue block and reverse movement through the left hand cue block. As before movement adjacent the smooth sensor 36 is interpreted as a demand for a single page turn. Depression on or movement adjacent the textured sensor 38 is interpreted as a demand either for continuous movement or turning of a section of pages, with the frequency or number being determined by the position of the user's finger etc relative to the ribbed surface.

In this embodiment, the relative location of the electrostatic (contactless) and capacitative (contact) sensors in each cue block means that the user's movements when using the electrostatic sensors to turn single pages are unlikely to result in inadvertent triggering of the capacitative sensor.

Clearly the device of this invention may be embodied in many different ways. For example, it may be made integral with a portable computer, adjacent the keyboard, or to one or both sides of the display screen.

What is claimed is:

1. A user interface device for allowing a user to progressively, logically move through a sequence of information available for display, the user interface comprising:

a cue object having at lease a first control surface region and a second control surface region, both of which are visually distinguishable by a user, one of said control surface regions comprising a ribbed or textured control surface;

user location/movement detecting means for detecting location, speed of movement, or both location and speed of movement of a user's gesture relative to each of said first control surface region and said second control surface region and for determining a relationship between a location or speed of movement of said user's gesture and at least one said control surface region; and control means responsive to an output of said user location/movement detecting means indicative of said relationship of said location or speed of movement of said user's gesture and said at least one control surface region, for accordingly altering a logical position or a speed of movement through said sequence of information available for display.

2. A user interface device according to claim 1, wherein said control surface regions are distinguishable by touch.

3. A user interface device according to claim 2, wherein said control surface regions comprise a smooth surface region and a ribbed or textured surface region.

4. A user interface device according to claim 2, wherein said control surface regions comprise a central generally curved smooth control surface region, with one downwardly inclined ribbed or textured control surface region disposed at each side thereof.

5. A user interface device according to claim 1, wherein the cue object includes means for attachment to a display panel on which said displayed information is presented in use.

6. A user interface device according to claim 1, wherein said means for detecting comprises means for detecting the location and/or movement of a user's hand or finger.

7. A user interface device according to claim 1, wherein said means for detecting includes transmitting means for providing an electrostatic field, receiving means for detecting said electrostatic field, and means responsive to the current at said receiving means for determining the user location.

8. A user interface device according to claim 1, wherein said means for detecting includes capacitive position sensing means.

9. A user interface device according to claim 1, wherein the user location/movement detecting means comprises:

a first sensor adjacent the first control surface region and a second sensor adjacent the second control surface region.

10. A user interface device according to claim 9, wherein said first sensor is a capacitative position sensing means and the second sensor includes means for generating an electrostatic field and means for detecting the disturbance thereto caused by user proximity.

11. A user interface device as claimed in claim 1, wherein on interpretation of the signals detected by the user location/movement detecting means as a particular user gesture the control means alters a logical position or a speed of movement through said sequence of information available for display in accordance with a predetermined instruction associated with said particular user gesture.

12. A user interface device as claimed in claim 1, wherein the control means is responsive to an output of said user location/movement detecting means indicative of a relationship of said location or movement of said user's gesture and the first control region by continuous movement through said sequence of information, and the control means is responsive to an output of said user location/movement detecting means indicative of a relationship of said location or movement of said user's gesture and the second control region by movement in a discrete step through the sequence of information.

13. A user interface device as claimed in claim 1, wherein an amount of alteration of logical position or of speed of movement by the control means is determined by user position relative to the associated control surface region.

14. A user interface device as claimed in claim 1, wherein the sequence of information available for display consists of an electrically stored document in a form of pages in a sequence.

15. A user interface device for allowing a user to progressively, logically move through a sequence of information available for display, the user interface comprising:

a cue object having a control surface region, said control surface region comprising a ribbed or textured control surface user location/movement detecting means for detecting user location or both user location and user speed of movement relative to the control surface region, and control means responsive to an output of said user location/movement detecting means for altering a logical position or speed of movement through said sequence of information available for display, wherein the amount of alteration of logical position by the control means is determined by user position relative to the associated control surface region.

16. A user interface device as claimed in claim 15, wherein the control means is adapted to interpret signals detected by the user location/movement detecting means as user gestures.

17. A user interface design as claimed in claim 16, wherein on interpretation of the signals detected by the user location/movement detecting means as a particular user gesture, the control means alters a logical position or speed of movement through said sequence of information available for display in accordance with a predetermined instruction associated with the particular user gesture.

18. A user interface device according to claim 15, wherein said means for detecting comprises means for detecting the location and/or movement of a user's hand or finger.

19. A user interface device according to claim 15, wherein said means for detecting includes transmitting means for providing an electrostatic field, receiving means for detecting said electrostatic field, and means responsive to the current at said receiving means for determining the user location.

20. A user interface device according to claim 15, wherein said means for detecting includes capacitative position sensing means.

21. A user interface device as claimed in claim 15, wherein the sequence of information available for display consists of an electrically stored document in a form of pages in a sequence.

* * * * *